United States Patent [19]
Rapozo

[11] Patent Number: 4,869,234
[45] Date of Patent: Sep. 26, 1989

[54] PASSIVE SOLAR HEATER

[76] Inventor: Edward S. Rapozo, P.O. Box 177, Kilauea, Hi. 96754

[21] Appl. No.: 144,100

[22] Filed: Jan. 15, 1988

[51] Int. Cl.$^4$ .............................................. F24J 2/04
[52] U.S. Cl. .................................. 126/443; 126/448; 126/447
[58] Field of Search ............... 126/443, 432, 448, 442, 126/415, 416, 444; 165/150, 177, 169, 168

[56] References Cited

U.S. PATENT DOCUMENTS

| | | | |
|---|---|---|---|
| 1,824,921 | 9/1931 | Oishei | 165/168 |
| 2,090,336 | 8/1937 | Stack | 165/169 |
| 2,552,237 | 5/1951 | Trombe | 126/442 |
| 4,187,832 | 2/1980 | Tregoning | 126/443 |
| 4,205,654 | 6/1980 | Jones | 126/443 |
| 4,249,520 | 2/1981 | Orillion | 126/439 |

Primary Examiner—Ira S. Lazarus
Assistant Examiner—Christopher Hayes
Attorney, Agent, or Firm—Kinzer, Plyer, Dorn, McEachran & Jambor

[57] ABSTRACT

The disclosed passive solar heater system defines a three dimensional tube array for conveying liquid between an inlet and an outlet, including a serial flow path through a heating stage, and possibly also a preheating stage. The heating stage has adjacent substantially straight parallel runs, with alternate ends interconnected to define a cage-like serpentine pattern. The straight heating stage runs of the tube array extend in vertical orientation, substantially over the full height of the tube array; and are in a generally cylindrical pattern, annularly and outwardly spaced from any preheating stage. Several embodiments of preheating stages are disclosed; and of the manner of enclosing the tube array for yeilding high thermal outputs. The tube array is enclosed in a transparent housing that may be adjustably vented.

20 Claims, 4 Drawing Sheets

PASSIVE SOLAR HEATER

BACKGROUND OF THE INVENTION

Solar heaters can heat water for many domestic, commercial and industrial needs. A basic feature of a solar heater is that it defines an enclosed liquid flow path, typically within tubing having good thermal conductivity; and the tubing is adapted to be exposed to the radiant heat of the sun. The tubing may be enclosed in a transparent housing, to minimize convective heat losses. Heat retaining material may surround the tubing, and/or black or heat-absorbing coatings may be on the tubing, for more effectively absorbing the radiant heat. A light collector device may be located adjacent the tubing for more effectively focusing the sun rays onto the tubing.

One configuration of the housing enclosure and/or light collector device is in the form of an elongated curved reflector, and a substantially straight run (or possibly a number of separate spaced runs) of tubing may be located at or near the focal axis of the reflector. Such a housing or collector device frequently is extended in a North-South alignment, and is pitched between 20 and 50 degrees above the horizontal, depending on the latitude. This orientation angles the collector so that it may be substantially normal to the sun's rays, as the sun moves across the sky during its daytime movement.

When the housing or collector device has no operating or moving parts, the solar heater may be considered as passive. A tracking system can be used to move the collector device about at least one axis, to track the sun during its daytime movement across the sky, for more effectively maintaining the sun rays properly focused on the liquid conveying tubing.

With the elongated collector configuration, and its low pitched orientation, both the passive and tracking collector take up considerable lateral area. Frequently the solar collector may be mounted on the roof of a building, to keep it out of the way, and also to locate it above small nearby foliage or other buildings that otherwise may block the sun. For these reasons also, a preferred location of the solar collector would be at the South side of a building; but when this also is at the front of the building, the solar collector may be conspicuously visible and possibly unsightly.

Tracking solar heaters operate with high thermal efficiencies, generating large thermal outputs with relatively short lengths of liquid conveying tubing. However, the moving parts and the needed controls for moving the parts, add to the costs of installation and continued operation.

Another form of a passive solar heater may arrange the liquid conveying tubing as a three-dimensional array. However, known tube arrays have drawbacks that may not fully utilize the radiant energy, and provide low thermal outputs or low outlet temperatures. Contributing conditions include that the sun rays strike only a few outer passes or runs in the tube array, and the sun is blocked from the remaining tubing; and/or the sun rays, throughout the course of the day, may radiate against the tubing at small angles, to yield high reflective losses; and/or the liquid flow sequence through the tube array may not provide the hottest temperatures at the heater outlet.

SUMMARY OF THE INVENTION

This invention provides a passive solar heater that can be located on the roof or the ground, that takes up little area, and that yet has a high thermal capacity. Moreover, the disclosed solar heater operates at a high thermal output throughout the day, even where the sun radiates against the solar heater from different angles.

The disclosed passive solar heater utilizes a vertically disposed three dimensional tube array for conveying a liquid between an inlet and an outlet. The tube array defines a serial flow path that includes a heating stage, and also possibly including a preheating stage upstream from the heating stage. The heating stage is extended substantially over the full height of the tube array around the exterior of the tube array, and is annularly and outwardly of and spaced from any preheating stage. The heating stage comprises spaced apart substantially straight parallel runs, alternately connected together at opposite upper and lower ends, to define a serpentine pattern, arranged as a generally cylindrical cage-like configuration, having its center axis aligned vertically.

DETAILED DESCRIPTION OF ILLUSTRATED EMBODIMENTS OF THE INVENTION

In general, each disclosed solar heater of this invention defines a three dimensional tube array, for conveying liquid in a serial flow path between an inlet and an outlet. Several configurations of tube arrays, and of housings around the tube arrays, will be disclosed herein. Each illustrated tube array is compact, while yet has many passes or runs of the serially arranged liquid flow path. The series flow path of the tube array may include a heating stage, and may also include a preheating stage upstream therefrom.

The heating stage extends generally vertically throughout the full height of the tube array, is on the outside of the tube array, and annularly surrounds any preheating stage. This allows solar radiation directly against large portions of the heating stage, regardless of the time of day and/or season, for maximizing outlet temperatures. The tube array is enclosed in a transparent housing, allowing direct solar radiation against the tube array while minimizing convective heat loss from the ambient air. The radiant energy is thus transferred convectively and conductively to the shaded portions of the tube array within the housing.

Each tube array may provide sufficient liquid-holding volume and tube area, to yield high thermal heating capacities of the liquid, even where the solar energy may radiate directly on possibly only 10–30% of the tube array. This is in contrast to most solar heaters, that require direct solar radiation on most, if not all, of the defined flow path tubing.

FIGS. 1–4, and 13 and 14 illustrate passive solar heater 10, having a square cross-section housing 12 with a structural base 14, four corner posts 16, and a cap 18; and with transparent panels 20, of glass or other suitable transparent material, supported thereby. A three dimensional tube array 24 is disposed in the housing 12, providing a serial flow path for liquid between inlet 26 and outlet 28, initially through preheating stage 30 and then serially through heating stage 32.

The preheating stage 30, immediately downstream of the inlet 26, is arranged as a substantially cylindrical helix having its longitudinal axis disposed substantially vertically, and having adjacent vertically spaced apart turns 34. A core 36 of insulating material may fit inside the helical preheating stage 30; and a cross member 38 may reinforce said core. A top plug 40 having lower sheets 42 of insulating material and an outer sheet 44 of copper may close the upper end of the core 36.

The heating stage 32, serially downstream from the preheating stage 30, has substantially straight parallel runs 46, laterally spaced apart and extended side-by-side generally in a vertical direction. The heating stage 32 is curved annularly or cylindrically around the preheating stage 30, at the outside of the tube array 24. Curved lower and upper ends 48 and 50 respectively, interconnect adjacent runs 46 at alternate ends, defining a serpentine pattern.

The helical preheating stage 30 extends generally throughout the full height of the tube array 24, to be generally even with both the lower and upper ends 48 and 50 of the heating stage 32. The upper end 51 of the preheating stage 30 crosses over radially to the heating stage 32, at its upper end as illustrated.

A cylindrical sleeve 52 of a perforated copper sheet may be fitted between the preheating stage 30 and the heating stage 32, in thermal contact with the liquid conveying tubing of each. A copper sheet 54 may be fitted under the preheating and heating stages at the base 14, in thermal contact with the liquid conveying tubing of each. The tube array 24 is defined of thermally conductive material, such as copper tubing; and may be formed as a single piece of such tubing or as many separate tubing pieces joined together in any conventional manner. The copper tubing, and each copper sheet 44, 52 and 54, may be painted or coated black for increased heat absorbency.

Figures 1, 2, 3, 4:
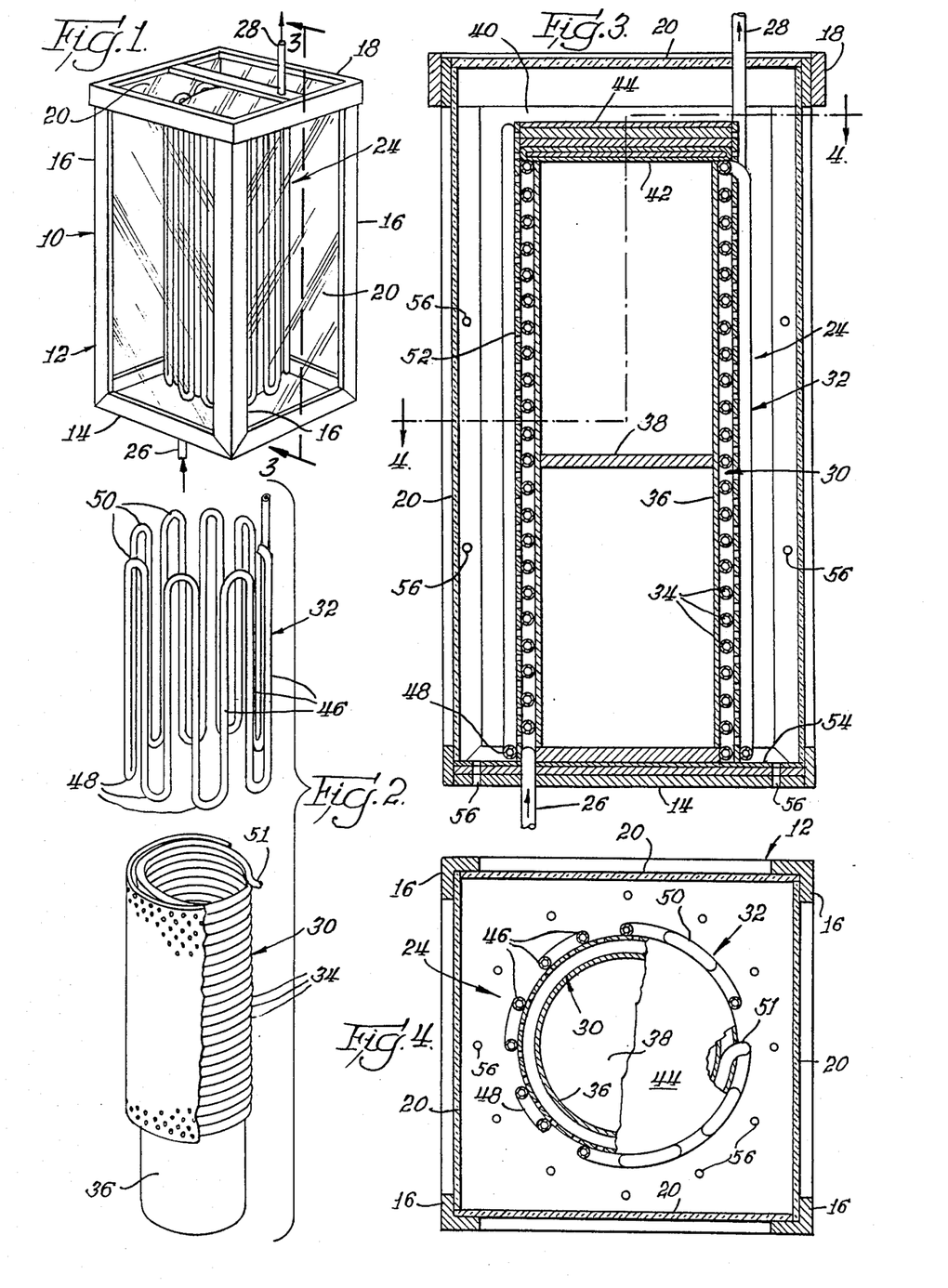
FIG. 1 is a perspective view of a first embodiment of solar heater of this invention.
FIG. 2 is an exploded view of the heating and preheating stages of the solar heater of FIG. 1.
FIG. 3 is an enlarged sectional view, as taken generally from line 3—3 in FIG. 1.
FIG. 4 is a sectional view, as taken generally from line 4—4 in FIG. 3.

The sun passes through the transparent housing 12, to radiate directly against some of the tubing of the heating stage 32, and via the spacing between the adjacent runs 46, against a portion of the cylindrical sleeve 52. The heat absorbed in the sleeve 52 is passed by direct thermal conduction to the tubing of the preheating stage 30, and to the air within the housing 12 to be circulated convectively about the housing interior for heating even the shaded tubing in the tube array 24.

The housing 12 has small openings 56 in the base 14 and in the corner posts 16 and/or panels 20, to allow migration of some air into and from the housing. Venting may be particularly important during humid conditions, where a cloud of moisture may develop inside a nonvented housing, and even condense on the housing panels to hinder effective penetration of the radiant energy.

FIGS. 5–7, and 15 and 16 illustrate passive solar heater 110, having a circular cross-section housing 112 with a structural base 114 and vertical posts 116, and with a transparent cap or dome 118 and transparent panels 120, of glass or other suitable material. The three dimensional tube array 124 in the housing 112, provides a serial flow path for liquid between inlet 126 and outlet 128, initially through preheating stage 130 and then serially through heating stage 132.

Figure 5:
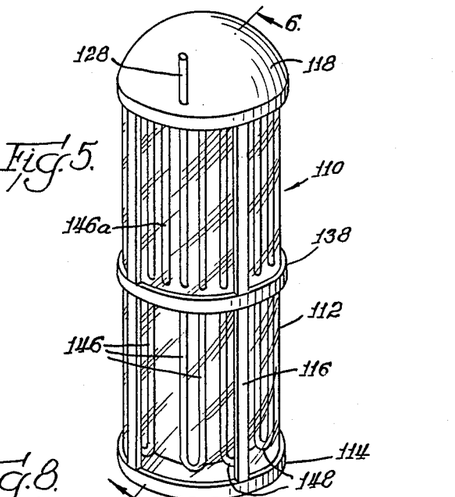
FIG. 5 is a perspective view of a second embodiment of solar heater of this invention.
Figure 6:
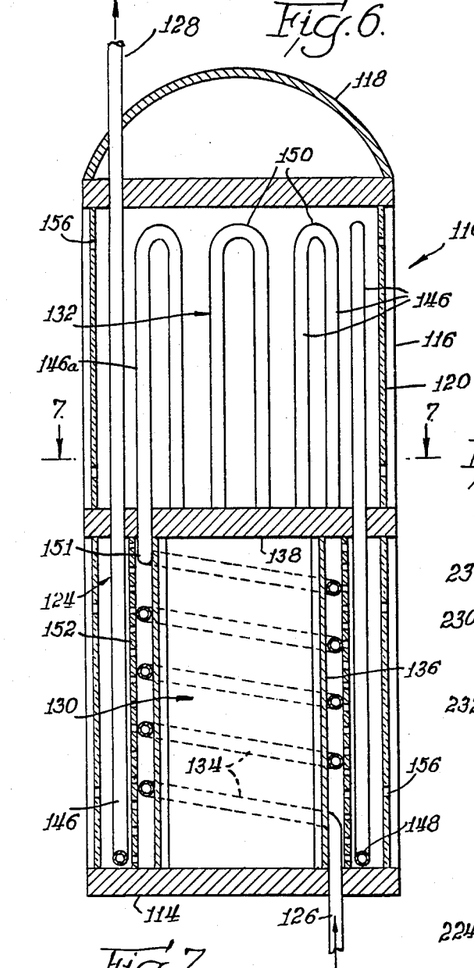
FIG. 6 is an enlarged sectional view, as taken generally from line 6—6 in FIG. 5.
Figure 7:
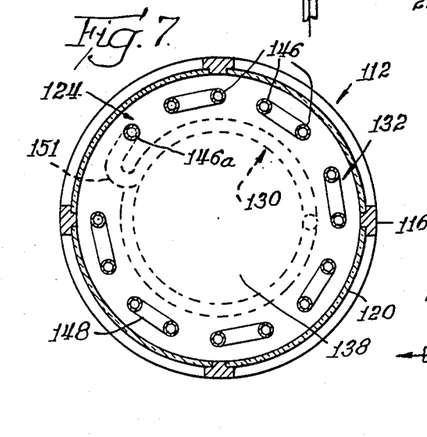
FIG. 7 is a sectional view, as taken generally from line 7—7 in FIG. 6.

The preheating stage 130, immediately downstream of the inlet 126, is arranged as a substantially cylindrical helix having its longitudinal axis disposed substantially vertically, and having adjacent vertically spaced turns 134. A core 136 of reflective or insulating material may fit inside the helical preheating stage 130; and a top plug 138 of insulating material may close the upper end of the core 136.

The heating stage 132, serially downstream from the preheating stage 130, has substantially straight parallel runs 146, laterally spaced apart and extended side-by-side generally in a vertical direction. The heating stage 132 is curved annularly or cylindrically around the preheating stage 130, at the outside of the tube array 124. Curved lower and upper ends 148 and 150 respectively, interconnect adjacent runs 146 at alternate ends, defining a serpentine pattern.

A cylindrical sleeve 152 of a perforated copper sheet may be fitted between the preheating stage 130 and the heating stage 132, in thermal contact with the liquid conveying tube of each. The tube array 124 may be defined of very high thermally conductive material, such as copper tubing; and may be formed as a single piece of such tubing or as many separate tubing pieces joined together in any conventional manner. The copper tubing, and copper sheet 152 may be painted or coated black for increasing the heat absorbency thereof.

The helical preheating stage 130 extends from generally near the bottom of the tube array 124 and the lower ends 148 of the heating stage 132, to an intermediate location of the heating stage 132, between the lower and upper ends 148 and 150 of the heating stage 132. The upper end 151 of the preheating stage 130 crosses over radially to the heating stage 132, and vertical run 146a continues upwardly to the curved upper end 150.

The transparent housing 112 allows the sun penetration against the outer liquid conveying tube of the heating stage 132; and the spacing between the adjacent runs 146 allows the sun penetration also against a large portion of the cylindrical sleeve 152, which conductively passes such absorbed heat to the inner preheating stage 130 and to the air within the housing 112, to be circulated convectively about the housing interior for heating even the shaded tubing in the tube array 124. The small openings 156 in the transparent panels, allows air migration into and out of the housing, to minimize fogging inside the housing.

Figure 8:
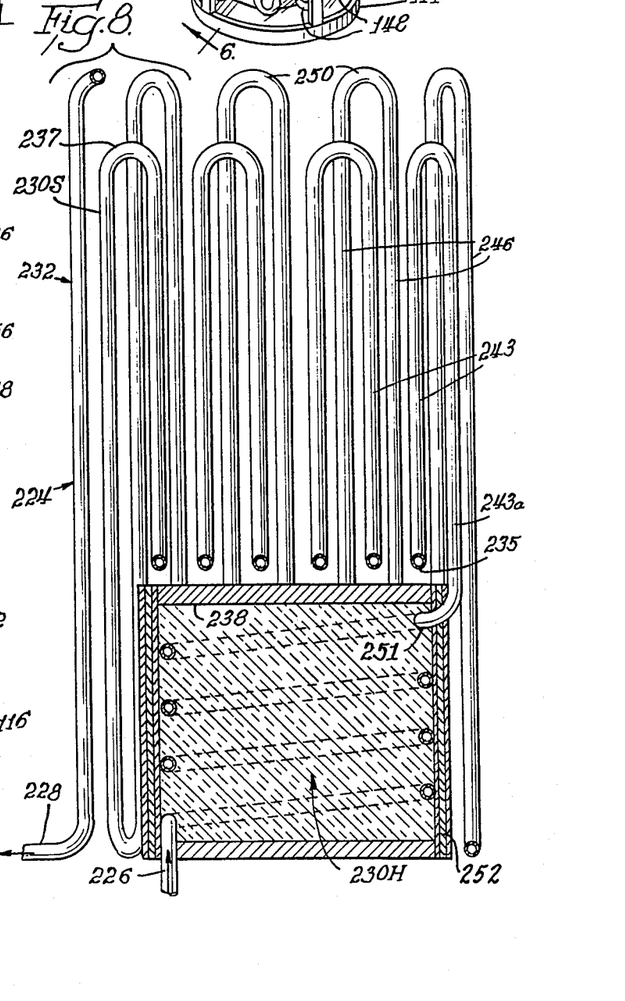
FIG. 8 is an elevational sectional view, similar to FIGS. 3 and 6, of another embodiment of solar heater of this invention, but with the exterior housing omitted from the view.
Figures 13, 14, 15, 16, 17, 18, 19, 20, 21, 22:
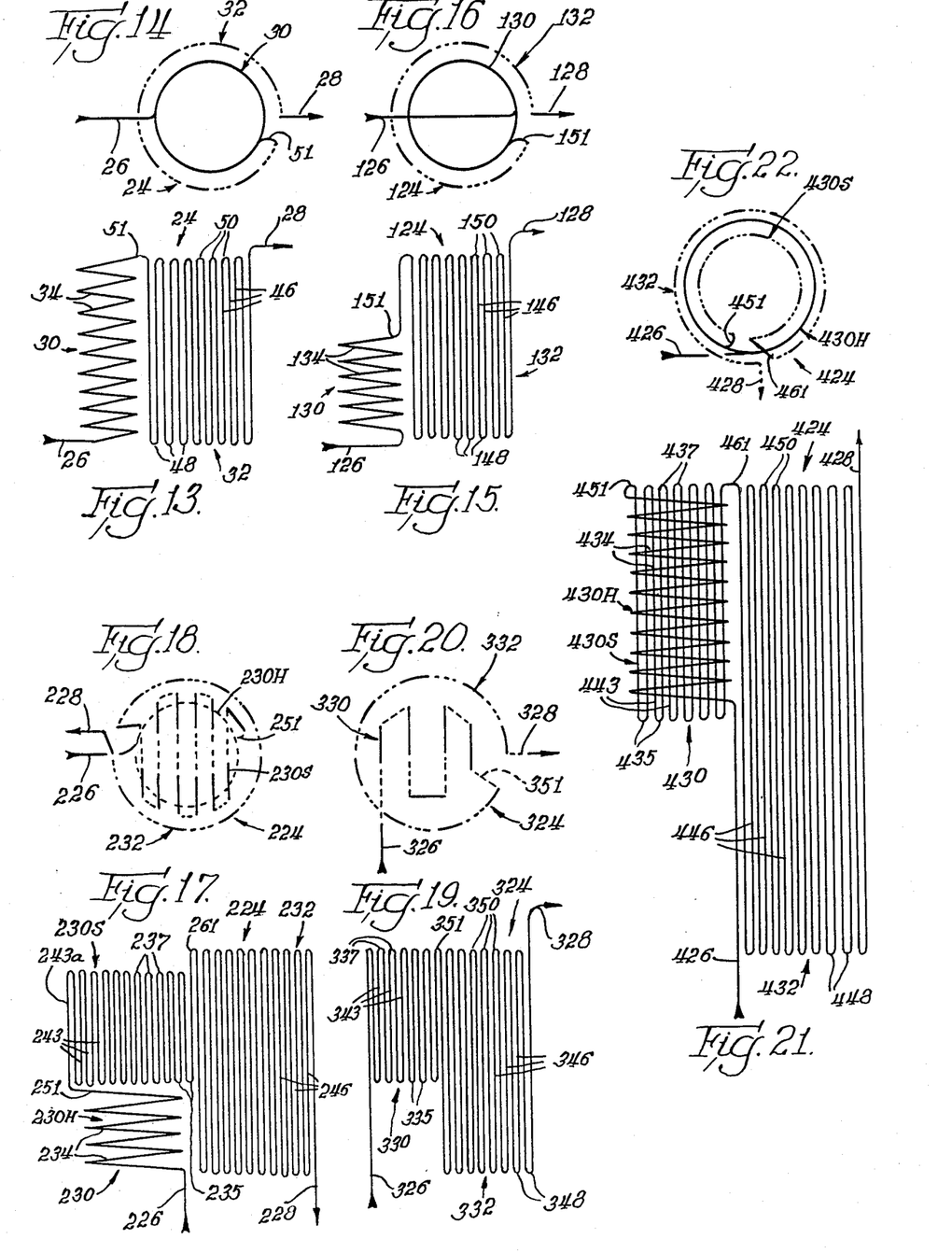
FIG. 13 is a schematic elevational view somewhat in a developed format, illustrating the flow circuit and tubing arrangement of the solar heater device more completely illustrated in FIGS. 1-4.
FIG. 14 is a schematic top plan view of the same circuit and flow arrangement.
FIGS. 15 and 16 are schematic elevational and top plan views, similar to FIGS. 13 and 14, except illustrating the flow circuit and tubing arrangement of the solar heater device more completely illustrated in FIGS. 5-7.
FIGS. 17 and 18 are schematic elevational and top plan views, similar to FIGS. 13 and 14, and FIGS. 15 and 16, except illustrating the flow circuit and tubing arrangement of the solar heater more completely illustrated in FIG. 8.
FIGS. 19 and 20 are schematic elevational and top plan views, similar to FIGS. 13 and 14, FIGS. 15 and 16, and FIGS. 17 and 18, except illustrating the flow circuit and tubing arrangement of the solar heater more completely illustrated in FIGS. 9 and 10.
FIGS. 21 and 22 are schematic elevational and top plan views, similar to FIGS. 13 and 14, FIGS. 15 and 16, FIGS. 17 and 18, and FIGS. 19 and 20, except illustrating a flow circuit and tubing arrangement of the solar heater device more completely illustrated in FIGS. 9 and 11.

FIGS. 8, and 17 and 18 illustrate tube array 224 (somewhat similar to tube array 124 just described) providing a serial flow path for liquid between inlet 226 and outlet 228, initially through preheating stage 230 and then serially through heating stage 232. However, the preheating stage 230 immediately downstream of the inlet 226, is arranged initially as a substantially cylindrical helix 230H having its longitudinal axis disposed substantially vertically, and having adjacent vertically spaced apart turns 234; and then in a serial flow path immediately downstream therefrom, as a serpentine pattern 230S. The serpentine pattern 230S has substantially straight parallel runs 243, laterally spaced apart and extended side-by-side generally in a vertical direction; and has curved lower and upper ends 235 and 237 respectively, interconnect adjacent runs 243 at alternate ends. The serpentine pattern 230S is arranged as separate side-by-side rows disposed in a zig-zag crosswise manner back and forth, contained radially within the outer heating stage 232 at the outside of the tube array.

A sleeve 252 of thermally conductive material may fit outside the helical preheating stage 230H; and a top plug 238 of insulating material may close the upper end of the sleeve, between the helical tubing 230H and the serpentine pattern tubing 230S of the preheating stage 230.

The heating stage 232, serially downstream from the preheating stage 230, has substantially straight parallel runs 246, laterally spaced apart and extended side-by-side generally in a vertical direction The heating stage 232 is curved annularly or cylindrically around the preheating stage 230, at the outside of the tube array 224. Curved lower and upper ends 248 and 250 respectively, interconnect adjacent runs 246 at alternate ends, defining a serpentine pattern.

The heating stage 232 extends the full height of the tube array 224. The helical coil 230H of the preheating stage 230 extends from generally even with the bottom of the tube array 224, to an intermediate location of the heating stage 232; and the vertically extended serpentine pattern 230S of the preheating stage 230 extends from generally just above the top of the helical preheating stage 230H, to generally just below the upper ends 250 of the heating stage 232. The upper end 251 of the helical preheating stage 230H crosses over radially to the lower end of the serpentine preheating stage 230S, to vertical run 243a that continues upwardly to the curved upper end 237; and the upper end 261 of the serpentine preheating stage 230S crosses over radially to the upper end of the heating stage 232, The vertical runs 243 and 246 of the preheating and heating stages 230S and 232 are spaced from one another, allowing for the simultaneous sun radiation directly against many of such runs.

FIGS. 9, 10, 19 and 20 illustrate another solar heater 310 having an octagonal cross-section housing 312 with a structural base 314, and with a cap or dome 318. Flat transparent panels 320 of glass or other suitable material meet at corner edges 316 and may be held together by clips 317, to define an open-ended sleeve section 315 disposed between the base 314 and dome 318. A three dimensional tube arrays 324 is located in the housing 312; and provides a serial flow path for liquid between inlet 326 and outlet 328 initially through preheating stage 330 and then serially through heating stage 332.

Figure 9:
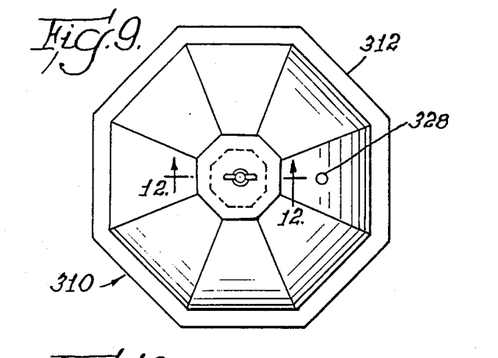
FIG. 9 is a top plan view, of yet another embodiment of solar heater of this invention.
Figure 10:
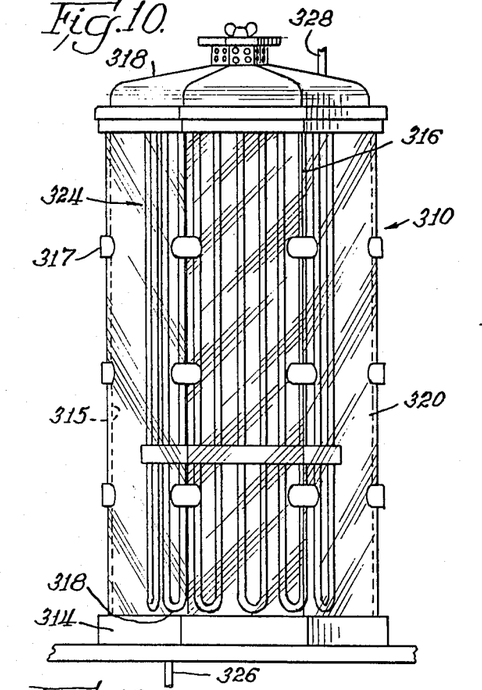
FIGS. 10 and 11 are elevational sectional views, similar to FIGS. 3 and 6, illustrating alternate embodiments that may be used with FIG. 9.

The preheating stage 330, immediately downstream of the inlet 326, is arranged initially as a serpentine pattern having substantially straight parallel runs 343, laterally spaced apart and extended side-by-side generally in a vertical direction; and having curved lower and upper ends 335 and 337 respectively, interconnecting the adjacent runs 343 at alternate ends. The serpentine pattern is arranged as separate side-by-side rows disposed in a zig-zag crosswise manner, contained radially within the outer heating stage 332 at the outside of the tube array 324.

The heating stage 332, serially downstream from the preheating stage 330, has substantially straight parallel runs 346, laterally spaced apart and extended side-by-side generally in a vertical direction. The heating stage 332 is curved annularly or cylindrically around the preheating stage 330, at the outside of the tube array 324. Curved lower and upper ends 348 and 350 respectively, interconnect adjacent runs 346 at alternate ends, defining a serpentine pattern.

The tube array 324 may be defined of very high thermally conductive material, such as copper tubing; may be formed as a single piece of such tubing or as many separate tubing pieces joined together in any conventional manner; and may be painted or coated black for increasing the heat absorbency thereof.

The helical preheating stage 330 extends from generally near the middle of the tube array 324, between the lower and upper ends 348 and 350 of the heating stage, to generally even with the upper ends 350 of the heating stage 332. The upper end 351 of the preheating stage 330 crosses over radially to the heating stage 332, near or at the curved upper end 350 thereof.

The transparent housing 312 allows the sun penetration against the outer liquid conveying tubing of the heating stage 332; and the spacing between the adjacent runs 346 allows the sun penetration also against a large number of the inner liquid conveying tubing of the preheating stage 330.

Figure 11:
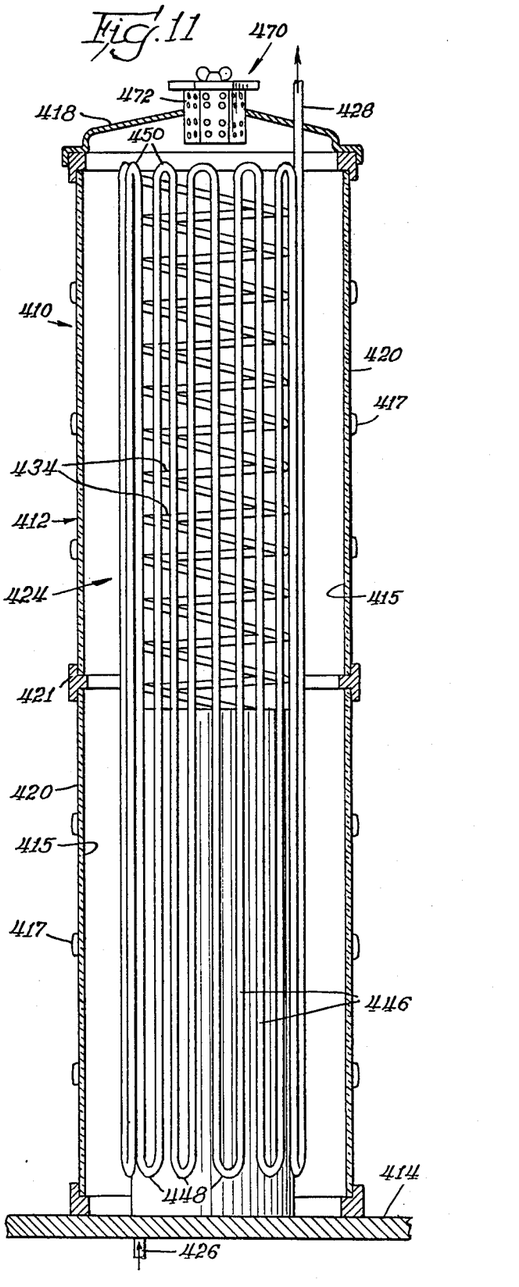

FIGS. 11, 21 and 22 illustrate another solar heater 410 having a similar octagonal cross-section housing 412, with a similar structural base 414 and with a similar cap or dome 418. However, two similar open-ended sleeve sections 415 are used between the base 414 and dome 418, each sleeve section 415 having flat transparent panels 420 of glass or other suitable material meeting at corner edges and having securing clips 417 at the edges.

Edge clip 421 is disposed between the sleeve sections 415, holding them aligned axially. This provides that solar heater 410 is substantially twice the size and has approximately twice the capacity, as the solar heater 310 of FIGS. 9, 10, 19 and 20.

A three dimensional tube array 424 is located in the housing 412; and provides a serial flow path for liquid between inlet 426 and outlet 428, initially through preheating stage 430 and then serially through heating stage 432. The preheating stage 430, immediately downstream of the inlet 426, is arranged initially as a substantially cylindrical helix 430H having its longitudinal axis disposed substantially vertically, and having adjacent vertically spaced apart turns 434; and then in a serial flow path immediately downstream therefrom, as a serpentine pattern 430S. This serpentine pattern 430S has substantially straight parallel runs 443, laterally spaced apart and extended side-by-side generally in a vertical direction; and has curved lower and upper ends 435 and 437 respectively, interconnect adjacent runs 443 at alternate ends. The serpentine pattern 230S is arranged as a cylindrical form contained, radially within the helical preheating stage 430H.

The heating stage 432, serially downstream from the preheating stage 430, has substantially straight parallel runs 446, laterally spaced apart and extended side-by-side generally in a vertical direction. The heating stage 432 is curved annularly or cylindrically around the preheating stage 430, at the outside of the tube array 424. Curved lower and upper ends 448 and 450 respectively, interconnect adjacent runs 446 at alternate ends, defining a serpentine pattern.

The tube array 424 may be defined of very high thermally conductive material, such as copper tubing; may be formed as a single piece of such tubing or as many separate tubing pieces joined together in any conventional manner; and may be painted or coated black for increasing the heat absorbency thereof.

The helical preheating stage 430H and the serpentine preheating stage 430S each extends from generally near the middle of the tube array 424, between the lower and upper ends 448 and 450 of the heating stage 432, to generally even with the upper ends 450 of the heating stage 432. The upper end 451 of the helical preheating stage 430H crosses radially inwardly to the serpentine preheating stage 430S, near or at the curved upper end 437 thereof; and the upper end 461 of the serpentine preheating stage 430S crosses radially outwardly to the heating stage 432, near or at the curved upper end 450 thereof.

The transparent housing 412 allows the sun penetration against the outer liquid conveying tube of the heating stage 432; and the spacing between the adjacent runs 446 allows the sun penetration also against a large number of inner liquid conveying tubes of the preheating stage 430.

An adjustable air vent 470 is disclosed to allow migration of air into and from either housing 312 or 412, illustrated in the FIGS. 9-12, as needed to avoid fogging within the housing enclosure. The vent 470 includes an octangle sleeve 472 sealed at its periphery within an opening in the dome 418 of the housing, a plate 474 secured across and closing the top of the sleeve, and a plate 476 fitted slidably within and closing the sleeve near its mid-point. A bolt 478 is fitted through an opening in the top plate 474, and is threaded into the slide plate 476 to be rotated, manually by integral wing nut head 479, relative to the slide plate to raise or lower the slide plate within the sleeve 472. Rows of openings 480, 481, 482 and 483 are located in the sleeve 472; rows 480 and 481 being inside of the housing, and rows 482 and 483 being outside of the housing.

Figure 12:
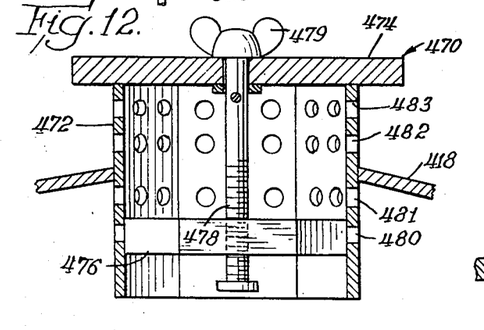
FIG. 12 is an enlarged sectional view, as taken generally from line 12—12 in FIG. 9.

By adjusting the axial location of the slide plate 476 within the sleeve 472, the effective path for air flow between the inside and outside of the housing may be adjusted, between being closed to providing maximum flow. Thus, when the slide plate 476 is positioned between the rows 481 and 482, the sleeve will be closed to block off flow between the inside and outside of the housing. When the slide plate 476 is positioned as illustrated over the lower row 480 of openings, air can pass through the openings 481 within the housing and the openings 482 and 483 to outside of the housing. With the slide plate 476 lowered below the openings 480, maximum air flow may occur between the inside and outside of the housing, via all of the openings.

It can be noted that the disclosed solar heaters are basically upstanding, and quite compact horizontally. Moreover, the tubing density is far in excess of the tubing density used in most known solar heaters. This provides an over capacity of liquid stored in the tube array, to yield an acceptable heating output even when the sun may radiate directly on possibly only 10-30% of the tubing in the tube array.

By way of example, a domestic solar heater intended for use in a water system normally having a thirty gallon hot water heater, may have an exterior housing between fifteen and thirty inches across; and between perhaps thirty and ninety inches high. The tube array within the housing would be several inches smaller, both in diameter and in height, to be spaced from the side and dome panels. The vertically disposed tubing runs may be spaced apart between approximately two and four inches; while the helically arranged tubing turns may be spaced apart between one and two inches.

Thus, the heating stage itself may have between possibly ten and forty separate serially arranged runs of tubing, yielding between possibly twenty five and one hundred fifty linear feet of tubing. The preheating stage may yield between 40-150% of this amount of serially arranged tubing. With tubing between $\frac{1}{4}$ and $\frac{1}{2}$ of an inch inside diameter, this may represent a length-to-diameter ratio of well in excess of 50:1 and up to possibly 500:1. The overall liquid storage capacity in such a tube array would be at least several gallons, and could be up to possibly thirty gallons.

With the heating stage of the tube array being at the outside of the tube array, and with vertical runs uniformally spaced around the tube array, except for when the sun is directly overhead, up to almost one-half of the heating stage tubing will be hit by direct sunlight, regardless of how low the sun rays are angled against the solar heater. The sun rays may also pass between the tubing of the heating stage, and strike against other tube array structure, including any heat dispersion sleeve or the preheating stage tubing located within the heating stage tubing. The shaded tubing of both the preheating and heating stages may be heated conductively or convectively within the housing, adding to the effective heating of the liquid passing through the solar heater.

The solar heater may be installed on any level spot, even the ground, and may be located closely adjacent a vertical wall of a nearby building, so long as it is on the side of the wall exposed to direct sunlight.

Although the invention has been described with respect to the illustrated embodiments, it should be understood that the invention is not limited to those embodiments. Modifications and/or additions may be included by those skilled in the art without departing from the scope of the invention as defined by the claims.

What I claim as my invention is:

1. A passive solar heater for a liquid, comprising the combination of
    a tube array for conveying the liquid between an inlet and an outlet, and including a heating stage arranged in a serial flow path between the inlet and the outlet;
    housing means substantially enclosing the tube array, and having transparent walls which substantially surround said tube array allowing for the passage of solar radiation therethrough so as to radiate against the tube array;
    the heating stage of the tube array having a plurality of adjacent substantially straight vertically disposed runs arranged in a generally cylindrical pattern; and
    the heating stage of the tube array extending substantially over the full height of the tube array.

2. A passive solar heater as claimed in claim 1, wherein further the tube array defines with said runs an overall serially arranged flow path between the inlet and outlet having a length-to-diameter ratio in the range between fifty and five hundred times the inner cross-section of any individual run.

3. A passive solar heater as claimed in claim 1, wherein further the tube array with said runs define an overall serially arranged flow path providing sufficient liquid heating and storage capacity to heat the liquid to an intended outlet temperature when between only 10–30% of the said runs are being exposed directly to the solar radiation, and the remaining 70–90% of the tube array and runs being heated conductively and convectively within the housing means.

4. A passive solar heater as claimed in claim 1, wherein further a preheating stage is disposed upstream of the heating stage, and the heating stage is disposed annularly and outwardly of and spaced from the preheating stage.

5. A passive solar heater as claimed in claim 4, wherein further the tube array defines with said preheating and heating stages an overall serially arranged flow path between the inlet and outlet having a length-to-diameter ratio in the range between fifty and five hundred times the inner cross-section of any individual run, and providing sufficient liquid heating and storage capacity to heat the liquid to an intended output even when between only 10–30% of the said runs are being exposed directly to the solar radiation, and the remaining 70–90of the tube array and runs being heated conductively and convectively within the housing means.

6. A passive solar heater system as claimed in claim 5, wherein further said adjacent runs of the heating stage are spaced apart between two and four inches, and said tube array having a horizontal dimension between thirteen and twenty eight inches across and a height between twenty eight and eighty eight inches.

7. A passive solar heater system as claimed in claim 5, wherein further a perforated partition is positioned in contact with and between the heating and preheating stages, said partition being formed of a material having high heat conductivity, operable to have high heat transfer to the preheating stage and allow for circulation of the housing air therethrough.

8. A passive solar heater as claimed in claim 5, wherein further vent means are provided in the housing means, at the lower and upper ends of the housing means, allowing for the migration of ambient air through the housing means; and
    means to provide adjustment of the vent means, said adjustment means being at the upper end of the housing means and including openings in the housing means and a member that may be relocated to adjustably cover and close the openings.

9. A passive solar heater as claimed in claim 8, wherein the housing means is formed of open-ended tubular components stacked and axially aligned end-to-end on one another, and means to hold the adjacent housing components together.

10. A passive solar heater as claimed in claim 4, wherein the preheating stage of the tube array is arranged as a substantially cylindrical helix, having its longitudinal axis generally aligned vertically and substantially coincidental with the axis of the cylindrical heating stage of the tube array.

11. A passive solar heater as claimed in claim 4, wherein the preheating stage of the tube array is arranged as a substantially cylindrical helix having its longitudinal axis generally arranged vertically, having adjacent turns vertically spaced apart from one another, and said helix extending substantially the full height of the tube array.

12. A passive solar heater as claimed in claim 4, wherein the preheating stage of the tube array is arranged as a substantially cylindrical helix having its longitudinal axis generally arranged vertically, having adjacent turns vertically spaced apart from one another, and said helix extending from a height generally even with the lower end of the heating stage to a height intermediate the lower and upper ends of the heating stage.

13. A passive solar heater as claimed in claim 4, further wherein the preheating stage of the tube array, is arranged in part as a substantially cylindrical helix having its longitudinal axis generally vertically, and having adjacent turns vertically spaced from one another, and in 7 art as a plurality of spaced substantially straight, parallel and vertical runs, the said helix and the said straight runs being serially connected together.

14. A passive solar heater as claimed in claim 13, further wherein said preheating stage helix extending, immediately downstream of the inlet, from a height generally even with the lower end of the heating stage to a height intermediate the lower and upper ends of the heating stage, and said preheating stage straight runs being extended serially downstream from the helix, between a height just above the upper end of the preheating stage helix and a height generally near the upper end of the heating stage.

15. A passive solar heater as claimed in claim 13, further wherein said preheating stage helix and said preheating stage straight runs are extended substantially coextensively between a height generally intermediate the lower and upper ends of the heating stage and a height generally near the upper end of the heating stage.

16. A passive solar heater as claimed in claim 15, further wherein the preheating stage helix is arranged with its adjacent turns disposed annuarly and outwardly of, and spaced from the preheating stage straight runs.

17. A passive solar heater as claimed in claim 4, wherein the preheating stage of the tube array is formed with adjacent straight runs extended substantially parallel to one another and vertically, and having alternate ends interconnected to form a serpentine pattern.

18. A passive solar heater as claimed in claim 17, wherein the preheating stage is extended from a height intermediate the lower and upper ends of the heating stage to a height generally near the upper end of the heating stage.

19. A passive solar heater as claimed in claim 17, wherein the serpentine pattern of the preheating stage straight runs is arranged as separate side-by-side rows disposed in a zig-zag crosswise manner contained radially within the outer heating stage of the tube array.

20. A passive solar heater as claimed in claim 17, wherein the serpentine pattern of the preheating stage straight runs is arranged as a cylindrical form contained radially within the outer heating stage of the tube array.

* * * * *